United States Patent Office 3,421,718
Patented Jan. 14, 1969

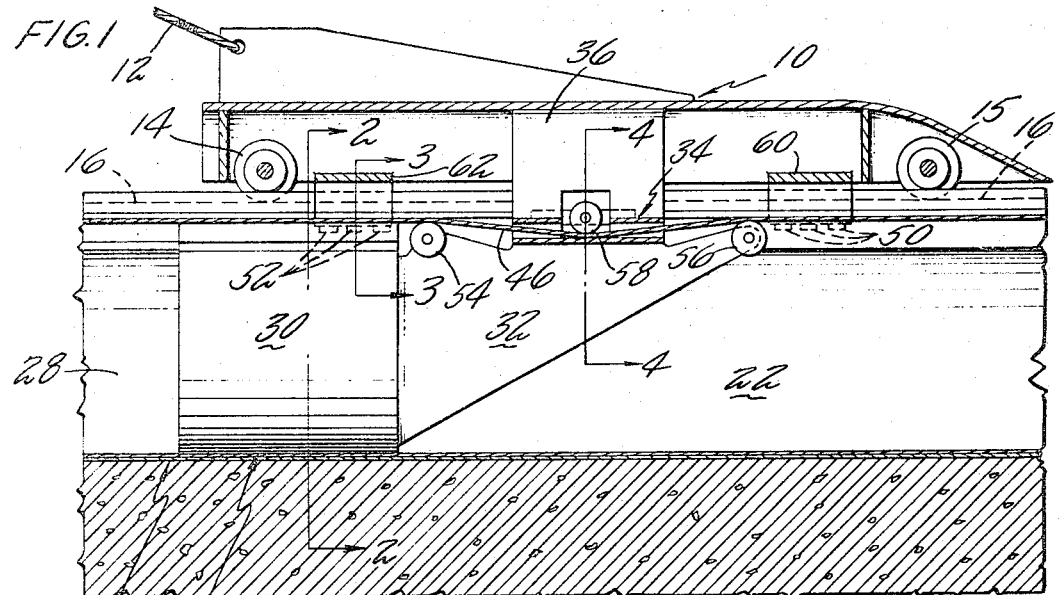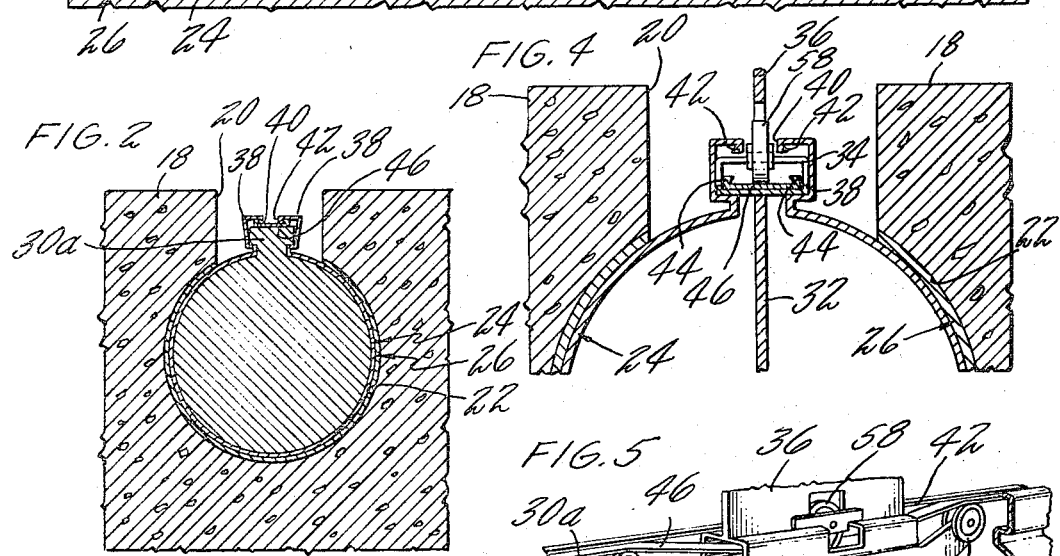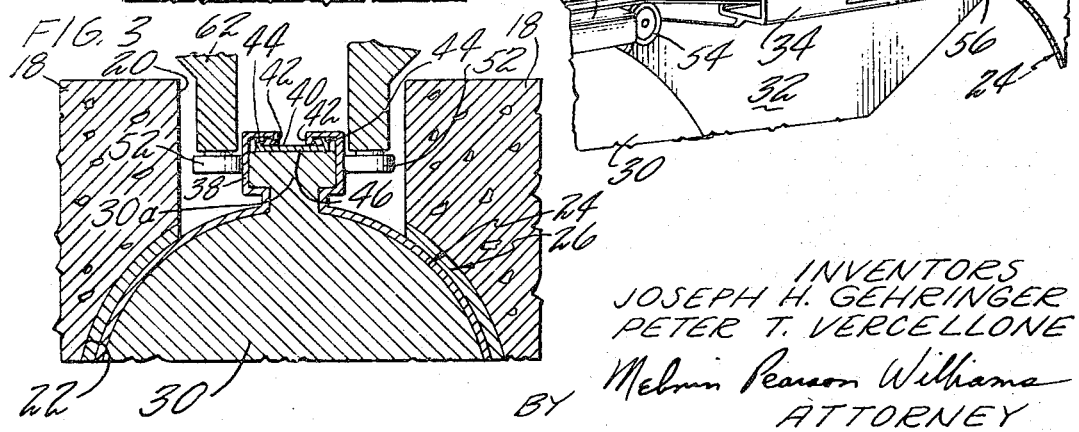

3,421,718
INTEGRAL SEAL FOR AIRCRAFT LAUNCHING CYLINDER
Joseph H. Gehringer, Ferguson, Mo., and Peter T. Vercellone, New Haven, Conn., assignors to United Aircraft Corporation, East Hartford, Conn., a corporation of Delaware
Filed Jan. 18, 1967, Ser. No. 610,093
U.S. Cl. 244—63    4 Claims
Int. Cl. B64f 1/04; F01b 29/08

ABSTRACT OF THE DISCLOSURE

A pneumatic cylinder for launching aircraft (similar to a catapult) having an elongated longitudinal slot extending the length thereof is provided with lips which are gripped by a longitudinal closure for sealing the slot. An incremental section of cylinder is flexed as the launching device approaches so as to permit the slot to be closed enough to release the grips of the seal, permitting the seal to drop so as to pass the launching device, and behind the launching device, the closure is returned to the seated position and the cylinder is released so as to permit the slot to open slightly thereby causing the seal to again be gripped by the lips.

Cross-reference to related applications

The present invention is particularly well-suited for use in aircraft launching systems of the type disclosed in the copending application of the same assignee entitled, Aircraft Launching, filed on even date herewith by John M. Tyler, Ser. No. 610,132. The invention may be utilized to advantage together with an aircraft launching cylinder structure of the type illustrated in another copending application of the same assignee entitled Floating Pneumatic Thrust Cylinder for Aircraft Launching System, filed on even date herewith by E. Feder, J. Kransnitski and P. Vercellone, Ser. No. 610,130.

Background of the invention

*Field of invention.*—This invention relates to aircraft launching systems, and more particularly to closure means for a longitudinal slot in the top of a pneumatic aircraft launching cylinder which eliminates structural and pneumatic discontinuities in the launching cylinder.

*Description of the prior art.*—One type of aircraft launching system known to the prior art utilizes fluid under pressure to force a piston along a cylinder, the cylinder having an elongated slot extending longitudinally thereof to permit connection of the launching device external of the cylinder with the piston which is internal thereof. In order to maintain pressure in the cylinder behind the piston, a closure is provided to seal the slot behind the piston as the piston traverses the length of the cylinder. The most common manner of effecting a seal between the closure and the cylinder utilizes the fluid pressure within the cylinder to force the closure upwardly against adjacent edges of the longitudinal slot in the cylinder. Seals of this type are illustrated in U.S. Patents No. 2,200,427, 2,485,601, 2,703,211, 2,792,755 and 3,028,125. A slightly different method of effecting a seal is illustrated in U.S. Patent No. 2,497,916 wherein pressure within the cylinder is forced behind a pair of closure members so as to cause lateral motion and mutual opposing lateral pressure to seal the slot. All of the foregoing closures rely on the integrity of the closure itself to maintain the pressure which provides the seal of the closure. In other words, since pressure within the cylinder provides the force which completes the seal of the closure, and the pressure within the cylinder cannot be maintained without an adequate seal of the closure, a rupture at any point along the length of the closure will cause the very force, which holds the closure in sealed position, to be lost. Thus, there is no "puncture integrity" in closures of this type. Additionally, closures which comprise essentially a single elongated ribbon which is held in place by pressure within the cylinder are limited in the maximum length within which they may be configured due to the tendency for long lengths of such closures to whip and/or present difficulty in achieving proper alignment. Furthermore, flexible closures which are not operatively engaged or supported throughout the length of the cylinder (that is, both before and after the piston) present large masses which are difficult to handle.

Another type of closure is illustrated in United Kingdom Patent No. 10,471, issued in 1845 to Dubern.

Therein, a pair of spring steel members cooperate with heavy grease so as to close the longitudinal slot of a cylinder. However, this device requires constant replenishment of the grease after a certain number of uses, and is limited in the amount of pressure which the closure will confine.

In aircraft launching systems known to the art, the problems in cylinder structure resulting from the longitudinal slot creating structural discontinuity in the cylinder, which in turn causes loss of hoop strength, have been treated by constructing the cylinder in as nearly a rigid fashion as possible. Thus, some cylinders have been embedded in concrete, and other cylinders are provided with structural support frames of a heavy nature, whereby the tendency of the cylinder to open up as a result of internal pressures has been resisted by the structural strength of material external to the cylinder. Examples of this type of cylinder structure are included in U.S. Patents Nos. 2,675,284 and 2,703,211. Such cylinders must be manufactured and aligned, with respect to therest of the launching system, to very close tolerances to avoid high friction resistance to the piston which causes hot spots and excessive wear.

Summary of invention

An object of the present invention is to provide an improved closure for the longitudinal slot in the cylinder of an aircraft launching system.

Another object of the present invention is to provide improved strength compensation for the structural discontinuity in an aircraft launching cylinder which results from the longitudinal slot formed therein.

In accordance with the present invention, the closure of the longitudinal slot of a cylinder used for launching aircraft in response to fluid under pressure comprises essentially a C clamp type of cross section wherein lips on the closure affirmatively engage matching lips on the cylinder, the cylinder being sprung outwardly against the lips of the closure so as to firmly grip the closure. The closure in accordance herewith is therefore affirmatively locked to the cylinder by other than the pressure which the closure is supposed to maintain, and the closure in turn provides peripheral continuity to the differential elements of the cylinder which otherwise is lost by the longitudinal slot therein.

In accordance with further aspects of the present invention, a passage for the launching apparatus is provided in the seal formed formed between the cylinder and the closure by flexing the cylinder inwardly so as to release the closure therefrom, at a differential length of the cylinder where the launching apparatus is passing, and releasing the flexure of the cylinder behind the passing launching apparatus so that it may again affirmatively engage the lips of the closure so as to provide a seal and structural strength.

The closure/cylinder combination in accordance herewith eliminates the possibility of an elongated, ribbon-like closure whipping or assuming random, uncontrolled positions which could prevent high speed seating of the closure with the cylinder so as to provide an adequate seal. Additionally, since the closure is affirmatively, mechanically latched to the cylinder at all points along the length of the closure, a rupture in some portion of the closure results only in loss of the pressure which passes through the rupture, rather than resulting in loss of the seal which causes the closure to remain in contact with the cylinder, whereby all pressure may be lost. The closure in accordance herewith further permits the use of launching cylinder structures which are not rigidly confined within heavy structural surroundings (such as results when the cylinder is embedded in concrete or confined within heavy steel rib members). Since the cylinder does not require heavy external structural support, it may be somewhat flexible, and by being flexible it need not be manufactured to the extreme tolerances which are required in rigid members. Additionally, the closure in accordance herewith is readily adapted for use in extremely long cylinders.

In accordance with a detailed embodiment of the invention, the aircraft launching mechanism which is propelled along the longitudinal slot of the launching cylinder is so configured that as it travels forwardly it flexes the upper cylinder walls (at the front of the launching mechanism) in a manner to partially close the longitudinal slot a slight amount sufficient to permit the closure to disengage from the lips thereon, and also to reengage the closure (at the rear of the launching mechanism), the cylinder stretching back to a normal shape, with the closure engaged, after the launching mechanism passes each differential element thereof.

*Description of the drawing*

FIG. 1 is a partially broken away, partially sectioned, side elevation of a pneumatic aircraft launching cylinder assembly, and particularly of an integral piston and tow cart capable of operating the integral seal of the present invention;

FIG. 2 is a section taken on the line 2—2 in FIG. 1;
FIG. 3 is a section taken on the line 3—3 in FIG. 1;
FIG. 4 is a section taken on the line 4—4 in FIG. 1;
FIG. 5 is a simplified, partially broken away perspective of the frame connecting the piston and cart (FIG. 1) and particularly of the seal manipulating mechanism therefor.

*Description of the preferred embodiment*

Referring now to FIGS. 1–5, in which various views of the preferred embodiment are shown, a tow cart 10 pulls a cable 12 which is connected to an aircraft (not shown) that is to be launched with the assistance of the device shown in FIG. 1. The cart 10 includes wheels 14, 15 which roll on tracks 16. Beneath the tracks 14, 15 is a concrete support structure 18 which has an elongated slot 20 extending longitudinally thereof, the slot providing access to a generally cylindrical void 22 which also extends longitudinally throughout the length of the concrete structure 18. Within the cylindrical void 20 is disposed a pneumatic thrust cylinder 24 which is separated from the concrete structure 18 by insulation material 26.

The cart 10 is driven from left to right (as shown in FIG. 1) by the action of gas under pressure within an area 28 which is behind a piston 30 that is slidably disposed within the cylinder 24. The piston 30 is attached by a lower structural vein 32 through a channel member 34 and an upper structural vein to the tow cart 10.

As is seen in FIGS. 2, 3 and 4, the upper part of the cylinder assembly 24 includes a square, channel-shaped section 38 having a slot 40 therein. A pair of dovetailed-shaped lips 42 define the edges of the slot, and depend downwardly therefrom so as to be engageable with corresponding dove-tailed shaped lips 44 on a closure member 46. It is the cooperation of the closurer member 46 with the cylinder assembly 24 by means of the lips 42, 44 which comprises the primary aspect of the present invention. As is seen in FIG. 2, the closure 46 is normally tightly engaged with the cylinder assembly 24 by means of the lips 42, 44. That is, except for an element of length coextensive with the position of the cart 10 at any given moment, the entire length of the cylinder assembly 24 is locked to the closure 46 by means of the lips 42, 44 as seen in FIG. 2. However, in order to permit passage of the connecting members 32, 34, 36 between the piston 30 and the cart 10 through the slot 40 of the cylinder assembly 24, a closure 46 is disengaged from the cylinder 24 by the cart itself as a result of its own motion. This is achieved by a combination of rollers 50–58, as is presently described.

Attached to the cart 10 by means of structural members 60, 62 (seen in FIGS. 1 and 3, but not shown in FIG. 5 for simplicity) are a plurality of rollers 50, 52 which flex inwardly the channel-shaped portion 38 of the cylinder assembly 24 (FIG. 3) so as to permit the dovetailed-shaped lips 44 on the closure 46 to disengage from the corresponding lips 42 on the cylinder assembly 24. The rollers 54, 56 which are rotatably disposed on the lower structural vein 32 hold the closure 46 upwardly in combination with a roller 58 which is rotatably disposed on the upper structural vein 36 pushing the closure 46 downwardly, so as to cause closure 46 to pass through the channel structure 34 as the cart and piston assembly travels from left to right as shown in FIG. 1. As is seen in FIG. 4, the combined action of the rollers 50, 52 is such that the lips 42 of the cylinder assembly 24 will be in the relatively closed position as a result of inward pressure by the rollers 50, 52 throughout the entire distance between the rollers 50, 52. Thus, the rollers 50 flex the lips 42 closer together, and the lips 44 therefore disengage therefrom, permitting the rollers 54, 56, 58 to orient the closure 46 so that the tubular structure member 34 may pass around the closure 46 as the cart assembly travels, the rollers 52 holding the lips 42 close together so that as the roller 54 forces the closure 46 back upwardly (FIG. 3), the closure 46 will be so positioned relative to the lips 42 that, as the rollers 52 pass to the right (as in FIG. 1), the lips 42 will engage lips 44 once again, as is illustrated in FIG. 2.

The depth of the vertical portion or sides of the tubular structure member 34, and the corresponding depth of the tubular structure portion 38 of the cylinder assembly 24 may be varied to suit different design criteria. For instance, if the side walls of the tubular structures 34, 38 are made substantially high, then the lips 42 will be flexed inwardly with relatively little pressure. On the other hand, if the side walls of the tubular structure members 34, 38 are made relatively short, then the hoop strength of the cylinder assembly 24 will be somewhat greater since there will be lesser bending moments possible in the vertical sections of the cylinder assembly 24. Generally speaking, a cylinder assembly composed of a proper gage of suitable steel will have sufficient flexure with relatively short side walls so that both these objectives will readily be achieved. As seen in FIGS. 2, 3 and 4, the concrete structure is not shown to be in direct contact with the upper extremities of the cylinder assembly 24. This illustrates the fact that hoop strength, or circular integrity, is not dependent upon lateral adjacent support of the concrete structure 18, but rather depends on the interlocking of the closure 46 with the lips 42 on the cylinder assembly 24.

The preferred embodiment as illustrated in the figures herein provides for the channel-like structural member 34 to be mounted above the piston 30 thereby requiring that the cylinder assembly 24 include the channel portion 38 in order to permit passage of the structural member 34. However, the apparatus herein described will work equally well with a structure similar to the structure member 34 mounted sufficiently low enough so as to permit it to pass through the cylindrical portion of the cylinder assembly 24. In such a case, the lips 42 could appear right on the periphery of the cylindrical portion of the cylinder assembly 24, thus providing maximum hoop strength to the cylinder assembly 24.

Similarly, although a cart including wheels is depicted in FIG. 1, it should be obvious that in any given configuration utilizing the present invention, the only necessary structural ingredients are the piston which supplies power and a means external of the piston for tethering the aircraft which is to be launched. These two means must be connected by apparatus similar in function to the structural member 34 which permits the mechanical interconnection around or beside the closure when the closure is disengaged from its sealing position with the lips 42.

As depicted in FIGS. 2 and 3, the channel-shaped portion 38 of the cylinder 24 is shown to be vertical when compressed inwardly by rollers 50, 52 (FIG. 3) and shown to be at a slight taper (FIG. 2) when relaxed into the normal gripping position. Of course, the adjustment of the rollers and the configuration of the particular structural members may be varied to suit any design implementation such that the flexure may be toward vertical or away from vertical as desired. Additionally, it is quite feasible to produce such a selective disengageable, flexed locking means for a closure which requires a flexing in the transverse direction of only some small fraction of an inch, whereby the orientation of the side walls of the channel portion 38 of the cylinder assembly 24 is relatively immaterial.

Although the invention has been shown and described with respect to the preferred embodiment thereof, it should be understood by those skilled in the art that the foregoing and various other changes and omissions in the form and detail thereof may be made therein without departing from the spirit and scope of the invention.

Having thus described a preferred embodiment of our invention, what we claim as new and desire to secure by Letters Patent of the United States is:

1. An aircraft launching cylinder assembly comprising: a pneumatic thrust cylinder having an elongated slot extending substantially throughout the entire length thereof, the edges of said slot having longitudinal lip members thereon, said lip members having surfaces oriented in a direction which is at least partially transverse to the direction of gravitational force thereat; and an elongated closure means for said slot, said elongated closure having longitudinal lip members at transversely opposite edges thereof, said longitudinal lip members adapted for operative engagement with the lip members on said cylinder so as to securely hold said closure in engagement with said cylinder in a manner so as to seal said slot when positioned adjacent thereto, the lip members on said closure having surfaces complementary to those on said slot, whereby said closure is held in position relative to said slot by said lip members, even in the event of loss of pressure within said thrust cylinder.

2. The invention described in claim 1 wherein said closure means, when engaged to said cylinder by said lip members, provides structural resistance to radial forces within said cylinder.

3. The invention described in claim 1 wherein said lip members on said cylinder are deformable so as to selectively engage and release the corresponding lip members of said closure means, the deformation of said lip members being in a direction which is parallel with the transverse cross section of said closure.

4. The invention described in claim 3 including a piston and cart assembly adapted to be driven longitudinally along said cylinder in response to pressurized gas within said cylinder, said cart including means for deforming the lip members on said cylinder as a result of the motion of said cart and piston assembly so as to selectively engage and release the corresponding lip members of said closure means.

References Cited

UNITED STATES PATENTS 2,497,916    2/1950    Stambaugh _____ 244—63

FOREIGN PATENTS

Ad. 64,302    6/1955    France.
707,679    6/1941    Germany.
478,427    1/1938    Great Britain.

MILTON BUCKLER, *Primary Examiner.*

P. E. SAUBERER, *Assistant Examiner.*

U.S. Cl. X.R.

92—88